United States Patent
Rensch et al.

(10) Patent No.: US 8,489,865 B1
(45) Date of Patent: Jul. 16, 2013

(54) DEVICE, SYSTEM, AND METHOD FOR SINGLE THREAD COMMAND CHAINING INSTRUCTIONS FROM MULTIPLE PROCESSOR ELEMENTS

(75) Inventors: Joshua W. Rensch, Lakeville, MN (US); Marlon O. Gunderson, Lake Elmo, MN (US); James V. Hedin, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 528 days.

(21) Appl. No.: 12/760,822

(22) Filed: Apr. 15, 2010

(51) Int. Cl.
G06F 7/38 (2006.01)
G06F 9/00 (2006.01)
G06F 9/44 (2006.01)
G06F 15/00 (2006.01)

(52) U.S. Cl.
USPC .......................................................... 712/220

(58) Field of Classification Search
USPC .......................................................... 712/243
See application file for complete search history.

(56) References Cited

U.S. PATENT DOCUMENTS

| 4,882,701 | A | * | 11/1989 | Ishii | 712/241 |
| 5,742,822 | A | * | 4/1998 | Motomura | 718/102 |
| 2006/0015707 | A1 | * | 1/2006 | Brown et al. | 712/242 |
| 2006/0212690 | A1 | * | 9/2006 | Magoshi | 712/234 |
| 2010/0312988 | A1 | * | 12/2010 | Bjorklund et al. | 712/3 |
| 2011/0023040 | A1 | * | 1/2011 | Hendry et al. | 718/102 |
| 2012/0036341 | A1 | * | 2/2012 | Morfey et al. | 712/229 |

* cited by examiner

Primary Examiner — Corey S Faherty
(74) Attorney, Agent, or Firm — Hamre, Schumann, Mueller & Larson, P.C.

(57) ABSTRACT

A command chain system includes plurality of processing elements, a memory, and a chain engine. The chain engine is in communication with the memory and accesses instructions in the memory. The chain engine accesses a subroutine stored in the memory. The chain engine sends a command to a specialized hardware. The chain engine performs an action determined by one or more of the operation-code portion, the skip portion, and the loop-count portion of the instruction.

18 Claims, 4 Drawing Sheets

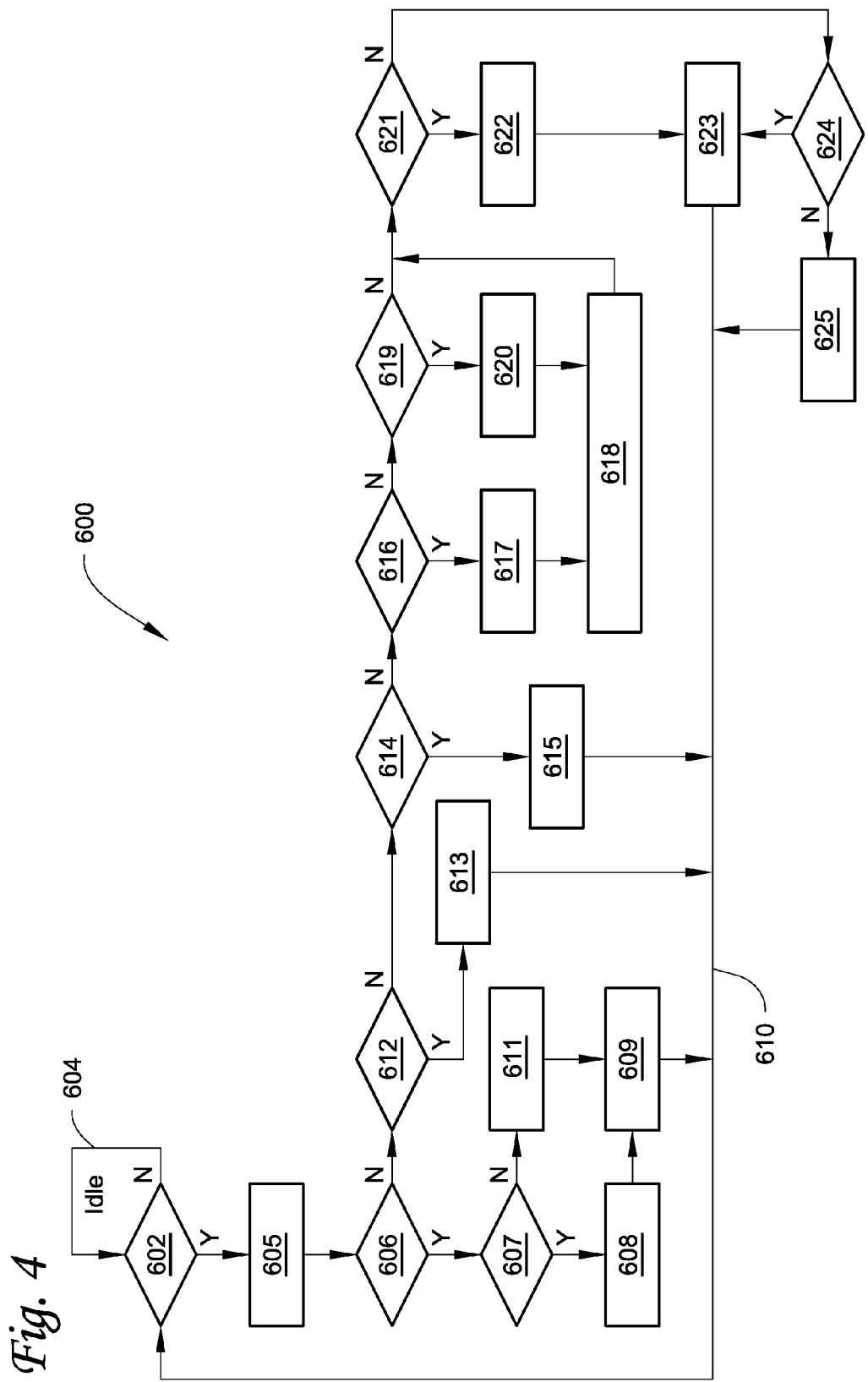

DEVICE, SYSTEM, AND METHOD FOR SINGLE THREAD COMMAND CHAINING INSTRUCTIONS FROM MULTIPLE PROCESSOR ELEMENTS

FIELD

This description relates generally to a device, system, and method for controlling a dedicated hardware that performs a specific function, wherein multiple processor elements share the operation of the dedicated hardware by a queuing of command strings for operating the dedicated hardware.

BACKGROUND

A specialized hardware function for performing a particular complex but repetitive task is often controlled by a number of input parameters grouped together called a command. A sequence of commands with differing control parameters may be issued from a controlling processing element. The sequence of commands may operate the specialized hardware to operate tasks repeatedly. For repeating operation, a processing element's command is reissued to the specialized hardware for each repeat operation. The operation may be queued. One type of a queuing structure is known as First-In-First-Out (FIFO) queuing. Another type of queuing structure is a sequential command instruction execution, which allows a sequence of commands to be repeated by restarting the command instruction execution at the beginning of a series of commands stored sequentially in a memory. Each of the above queuing structure has advantages and disadvantages.

For a system having multiple processing elements operating a common specialized hardware, both FIFO and sequential command instruction execution may result in undesirable and/or inefficient operation of the common specialized hardware. FIFO does not automatically reissue the same command or sequence of commands. Accordingly, a processor has to reissue the same command or sequence of commands every time the processor wants to repeat them. One way to implement sequential command instruction execution is to utilize independent instruction sequence execution for each processing element which is costly and does not scale to large numbers of processing element.

BRIEF SUMMARY

An embodiment of a memory includes an instruction having a format that includes a skip portion, an operation-code portion, a loop-count portion, and an argument portion. In another embodiment, the memory further includes a plurality of subroutines, the argument portion includes memory address for one of the plurality of subroutines. In another embodiment, each subroutine includes at least one command instruction and a return instruction.

In another embodiment, the memory further includes an instruction hub that includes a plurality of the instructions, each of the instructions includes a skip portion, an operation-code portion, a loop-count portion, and an argument portion. In another embodiment, the instruction hub includes a jump/halt instruction. In another embodiment, the memory includes the plurality of instructions in the instruction hub are stored sequentially and the jump/halt instruction is stored at the end of the sequence of the plurality of instructions. In another embodiment, the instruction is configured such that the skip portion is changeable based on the loop-count portion of the instruction.

An embodiment of a method for command chaining instructions includes writing an instruction to a memory, wherein the instruction includes a skip portion, an operation-code portion, a loop-count portion, and an argument portion, and a chain engine reading the instruction and performing one or more actions determined by one or more of the operation-code portion, the skip portion, and the loop-count portion.

In another embodiment, the method includes one or more of the following actions: setting the chain engine to an idle state, sending a command to a specialized hardware, wherein the command is directed from the argument portion, skipping to a next instruction, changing the skip portion, and/or changing the loop-count portion.

In another embodiment, the method includes changing the skip portion by writing a modified instruction to the memory, wherein the modified instruction has a different value for the skip portion than the instruction read by the chain engine.

In another embodiment, the method includes changing the loop-count portion by writing a modified instruction to the memory wherein the loop-count portion has a different value than the loop-count portion of the instruction read by the chain engine. In another embodiment, the method includes the loop-count portion of the modified instruction having a lesser value than the loop-count portion of the instruction read by the chain engine. In another embodiment, the method includes the skip portion of the modified instruction being determined by the loop-count portion of the instruction read by the chain engine.

In another embodiment, the method further includes writing a plurality of the instructions to the memory, wherein each of the instructions includes a skip portion, an operation-code portion, a loop-count portion, and an argument portion, and the chain engine reading one of the instructions and performing one or more actions determined by one or more of the operation-code portion, the skip portion, and the loop-count portion of the read instruction. In another embodiment, the method further includes writing a jump/halt instruction to the memory. In another embodiment, the method includes the skipping to the next instruction including reading an address of the next instruction. An embodiment stores the address of the next instruction in a stack, wherein the chain engine includes the stack configured to store the address of the next instruction. In another embodiment, the method further includes providing a processing element that is configured to write the instruction to the memory.

In another embodiment, the method includes the processing element further writing a subroutine to the memory, wherein the subroutine includes a command, and the chain engine reads the argument portion that includes an address of the subroutine, the chain engine storing an address of a next instruction in a stack. The next instruction follows in sequence after the instruction read by the chain engine. Then, the chain engine reads the command from the memory, and sends the command to a specialized hardware.

In an embodiment, command chain system includes a memory that includes an instruction hub, wherein the instruction hub includes a plurality of instructions, each of the instructions including a skip portion, a operation-code portion, a loop-count portion, and an argument portion. The command chain system includes a chain engine in communication with the memory, a plurality of processing elements in communication with the memory and the chain engine, and a specialized hardware in communication with the chain engine.

In another embodiment, the command chain system includes the chain engine being configured to start sequential access of the instructions in the instruction hub when one of the plurality of processing elements sends an execution command to the chain engine. The embodiment includes the chain engine being configured to perform acts determined by one or more of the operation-code portion, the skip portion, and the loop-count portion.

BRIEF DESCRIPTION OF THE DRAWINGS

FIG. 4 is an algorithm according to an embodiment of a method.

DETAILED DESCRIPTION

Figure 1:
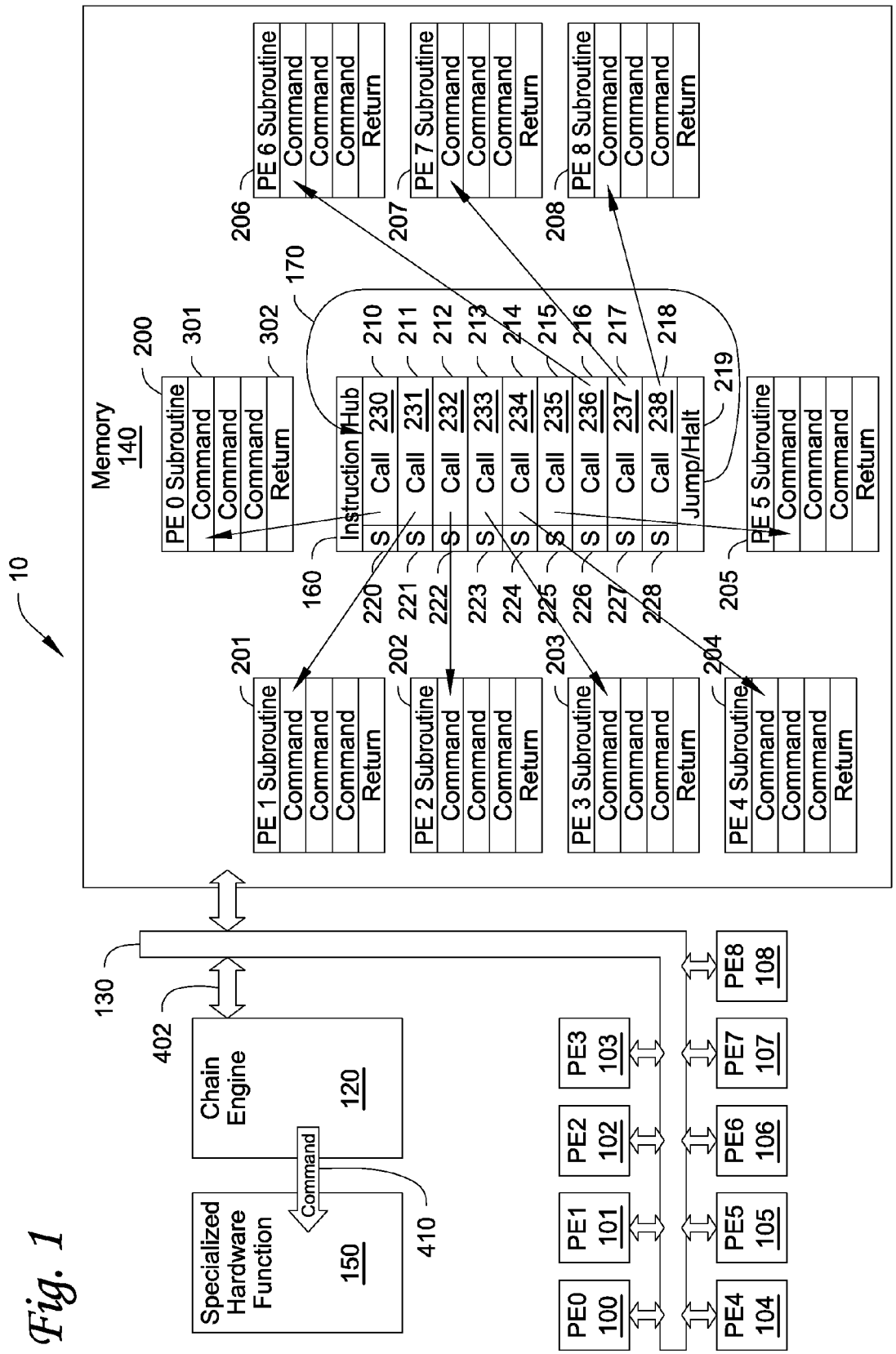
FIG. 1 is a drawing showing a system according to an embodiment.

FIG. 1 shows an embodiment of a single-thread command chain system 10. The single-thread command chain system 10 of FIG. 1 shows multiple processing elements 100, 101, 102, 103, 104, 105, 106, 107, 108 in communication with a chain engine 120 and a memory 140. Also shown in FIG. 1 is the chain engine 120 in communication with a specialized hardware that receives a specialized hardware function 150.

Although FIG. 1 shows nine processing elements 100, 101, 102, 103, 104, 105, 106, 107, 108 any number of processing elements 100, 101, 102, 103, 104, 105, 106, 107, 108 may be included in the single-thread command chain system 10. For example, there may be one or more, two or more, or three or more processing elements 100, 101, 102, 103, 104, 105, 106, 107, 108 in the system 10. A processing element includes but is not limited to the following: a microprocessor, a general purpose central processing unit (CPU), a signal processor, etc. Different types of processing elements 100, 101, 102, 103, 104, 105, 106, 107, 108 may be included in the single-thread command chain system 10. The processing elements 100, 101, 102, 103, 104, 105, 106, 107, 108 are in communication with the memory 140.

FIG. 1 shows an example of a communication 130 device, configuration, and/or method for sending and/or receiving data. Communication 130 may be achieved by hardware, such as a data bus, a shared data bus, one or more cables, one or more optical fibers, a network, a wireless network, and/or a combination thereof. In an embodiment, communication 130 is achieved by connecting the processing elements 100, 101, 102, 103, 104, 105, 106, 107, 108, the memory 140, and the chain engine 120 to a shared data bus. In another embodiment, communication 130 is achieved by connecting the processing elements 100, 101, 102, 103, 104, 105, 106, 107, 108, the memory 140, and the chain engine 120 to a network.

An embodiment of the memory 140 is a random access memory (RAM). However, memory 140 is not limited to RAM. Memory 140 may be a non-transitory device configured to store data, wherein the data is accessible, readable, and writable by one or more processing elements 100, 101, 102, 103, 104, 105, 106, 107, 108. FIG. 1 shows the memory 140 including address areas 200, 201, 202, 203, 204, 205, 206, 207, 208. Each of these address areas 200, 201, 202, 203, 204, 205, 206, 207, 208 is a section of the memory 140 that is reserved for access by a specific one of the processing elements 100, 101, 102, 103, 104, 105, 106, 107, 108. For example, the address area 200 may be reserved for access by the processing element 100, wherein the address area 200 stores a subroutine of commands of the processing element 100. For example, the address area 201 may be reserved for access by the processing element 101, wherein the address area 201 stores a subroutine of commands of the processing element 101. For example, the address area 202 may be reserved for access by the processing element 102, wherein the address area 202 stores a subroutine of commands of the processing element 102. For example, the address area 203 may be reserved for access by the processing element 103, wherein the address area 203 stores a subroutine of commands of the processing element 103. For example, the address area 204 may be reserved for access by the processing element 104, wherein the address area 204 stores a subroutine of commands of the processing element 104. For example, the address area 205 may be reserved for access by the processing element 105, wherein the address area 205 stores a subroutine of commands of the processing element 105. For example, the address area 206 may be reserved for access by the processing element 106, wherein the address area 206 stores a subroutine of commands of the processing element 106. For example, the address area 207 may be reserved for access by the processing element 107, wherein the address area 207 stores a subroutine of commands of the processing element 107. For example, the address area 208 may be reserved for access by the processing element 108, wherein the address area 208 stores a subroutine of commands of the processing element 108.

Although FIG. 1 shows nine address areas 200, 201, 202, 203, 204, 205, 206, 207, 208 any number of address areas 200, 201, 202, 203, 204, 205, 206, 207, 208 may be included in the memory 140. In an embodiment, the number of address areas 200, 201, 202, 203, 204, 205, 206, 207, 208 is equal the number of processing elements 100, 101, 102, 103, 104, 105, 106, 107, 108. In another embodiment, the number of address areas 200, 201, 202, 203, 204, 205, 206, 207, 208 is greater or fewer than the number of processing elements 100, 101, 102, 103, 104, 105, 106, 107, 108.

FIG. 1 shows the memory 140 also including an instruction hub 160. The instruction hub 160 is an area in the memory 140 configured to be commonly accessible by the processing elements 100, 101, 102, 103, 104, 105, 106, 107, 108, wherein at least one of the memory slots 210, 211, 212, 213, 214, 215, 216, 217, 218, 219 is associated with a processing element. The memory slots 210, 211, 212, 213, 214, 215, 216, 217, 218, 219 are part of the memory reserved to be commonly accessible by the plurality of processing elements 100, 101, 102, 103, 104, 105, 106, 107, 108. The memory slots 210, 211, 212, 213, 214, 215, 216, 217, 218, 219 can be addresses in the memory 140. Although FIG. 1 shows ten memory slots 210, 211, 212, 213, 214, 215, 216, 217, 218, 219, any number of memory slots 210, 211, 212, 213, 214, 215, 216, 217, 218, 219 may be included in the memory 140. In an embodiment, the total number of memory slots 210, 211, 212, 213, 214, 215, 216, 217, 218, 219 is equal to the number of processing elements 100, 101, 102, 103, 104, 105, 106, 107, 108. In another embodiment, the total number of memory slots 210, 211, 212, 213, 214, 215, 216, 217, 218, 219 is one plus the number of processing elements 100, 101, 102, 103, 104, 105, 106, 107, 108. In another embodiment, the total number of memory slots is greater or fewer than the number of processing elements 100, 101, 102, 103, 104, 105, 106, 107, 108.

FIG. 1 shows the instruction hub 160 configured for sequential loop access 170. In an embodiment, the memory slots 210, 211, 212, 213, 214, 215, 216, 217, 218, 219 are configured such that each slot may be accessed sequentially one after the other. After the last slot is accessed, access is looped to the slot in the first position. Thus, although the memory slots 210, 211, 212, 213, 214, 215, 216, 217, 218, 219 are shown in FIG. 1 as rows in a column, it should be understood that the memory slots 210, 211, 212, 213, 214, 215, 216, 217, 218, 219 may be described as having a circular loop configuration.

In an embodiment, a jump/halt instruction may have a "halt" operation-code portion that instructs the chain engine to stop the sequential loop access of the memory slots 210, 211, 212, 213, 214, 215, 216, 217, 218, 219 in the instruction hub 160 by setting the chain engine 120 to an idle state. When a jump/halt instruction has a "halt" operation-code portion, then the jump/halt instruction is also used herein as a halt instruction. When the halt instruction or the jump/halt instruction having a "halt" operation-code portion, in the jump/halt slot 219 is read, accessing the instruction hub 160 is stopped.

In another embodiment, when the jump/halt instruction stored in the jump/halt slot 219 or the halt instruction is read by the chain engine, the sequential loop access of the instruction hub 160 is not stopped until certain other conditions are met. Depending on the other conditions, the chain engine may treat the halt instruction as a jump instruction, thus restarting the access of the instruction hub 160 and the slot in the first position is accessed. The argument portion of the halt instruction points to the beginning of the instruction hub 160, which in effect creates a circular instruction chain when the chain engine treats the halt instruction as a jump instruction.

In an embodiment, one of the memory slots 210, 211, 212, 213, 214, 215, 216, 217, 218, 219 may be a designated jump/halt slot 219 for storing a jump/halt instruction. A jump/halt instruction may have a "jump" operation-code portion that instructs the chain engine to continue sequential loop access of the memory slots 210, 211, 212, 213, 214, 215, 216, 217, 218, 219 in the instruction hub 160 by restarting the loop access. When a jump/halt instruction has a "jump" operation-code portion, then the jump/halt instruction is also used herein as a jump instruction. Thus, after the jump/halt instruction in the jump/halt slot 219 is read, accessing the instruction hub 160 is restarted and the memory slot in the first position 210 is accessed. The argument portion of the instruction points to the beginning of the instruction hub 160, which in effect creates a circular instruction chain.

In another embodiment, when the jump/halt instruction stored in the jump/halt slot 219 or the jump instruction is read by the chain engine, the sequential loop access of the instruction hub 160 is stopped when certain other conditions are met. Depending on the other conditions, the chain engine may treat the jump instruction as a halt instruction, thus stopping the access of the instruction hub 160 and the slot in the first position is not accessed.

In an embodiment, the jump/halt slot 219 is placed at the end of a sequence of memory slots 210, 211, 212, 213, 214, 215, 216, 217, 218, 219 and an instruction having a halt operation-code portion is stored in the jump/halt slot 219, so that by default, the sequential loop access of the instruction hub 160 is stopped when the halt instruction is read by the chain engine 120. However, in the embodiment, the chain engine 120 is configured to interpret the halt instruction as a jump instruction when certain conditions are met. The embodiment has a chain engine 120 that is configured with a new execution bit 408 (see FIG. 2), such that when the new execution bit 408 is set, the next instruction read having the halt operation-code portion is understood by the chain engine 120 as a jump and the chain engine 120 accesses the instruction hub 160 by restarting at the slot in the first position of the instruction hub 160.

The jump/halt slot 219 is identical to other memory slots 210, 211, 212, 213, 214, 215, 216, 217, 218 but it is designated to be the jump/halt slot 219 because of a particular instruction feature thereof, such as the operation-code portion of the instruction stored in the jump/halt slot 219. Although in FIG. 1 the location of the jump/halt slot 219 is shown to be the last slot of the instruction hub 160, the jump/halt slot 219 may be located in a different order with respect to the other memory slots 210, 211, 212, 213, 214, 215, 216, 217, 218.

In another embodiment, there is more than one jump/halt slot 219 in the instruction hub 160. In the embodiment, a jump/halt slot 219 containing a jump instruction is provided in the last memory slot of the instruction hub 160, which allows another jump/halt slot to be provided anywhere in the instruction hub 160 storing a halt instruction. The halt instruction would then be acted upon or ignored depending upon certain conditions, but would not cause a jump. The jump instruction would cause a jump back to, for example, the beginning of the instruction hub.

In an embodiment, each of the instructions stored in the memory slots 210, 211, 212, 213, 214, 215, 216, 217, 218 includes a skip portion 220, 221, 222, 223, 224, 225, 226, 227, 228 and an argument portion 230, 231, 232, 233, 234, 235, 236, 237, 238. In the embodiment shown, the skip portion 220, 221, 222, 223, 224, 225, 226, 227, 228 is a bit, or a binary instruction, having a default value of 0 when not set, and a value of 1 when set. The skip portion 220, 221, 222, 223, 224, 225, 226, 227, 228, when set, is an instruction that causes sequential loop access of the memory slots 210, 211, 212, 213, 214, 215, 216, 217, 218, 219 to continue without acting on the basis of data in the argument portion 230, 231, 232, 233, 234, 235, 236, 237, 238. The data in the argument portion 230, 231, 232, 233, 234, 235, 236, 237, 238 may be a call to another memory address. When the skip portion 220, 221, 222, 223, 224, 225, 226, 227, 228 is not set, the argument portion 230, 231, 232, 233, 234, 235, 236, 237, 238 associated with the skip portion 220, 221, 222, 223, 224, 225, 226, 227, 228 is acted upon. The instructions in the memory slots 210, 211, 212, 213, 214, 215, 216, 217, 218 each may include a loop-count portion so that after the instructions have been executed a certain number of times, the skip portion 220, 221, 222, 223, 224, 225, 226, 227, 228 is set. Alternative ways of providing an instruction may include a skip portion 220, 221, 222, 223, 224, 225, 226, 227, 228 being something other than being in the form of a bit.

A call instruction is an instruction having a "call" operation-code portion and a memory address in the argument portion. FIG. 1 shows the instructions stored in the memory slots 210, 211, 212, 213, 214, 215, 216, 217, 218 being call instructions. The call instruction includes an argument portion that directs to an address area 200, 201, 202, 203, 204, 205, 206, 207, 208, wherein the call instruction and the address area 200, 201, 202, 203, 204, 205, 206, 207, 208 are associated with a specific processing element. The subroutine stored in the address area 200, 201, 202, 203, 204, 205, 206, 207, 208 is a set of commands of the specific processing element. A processing element accesses the memory and writes the subroutine to the memory. The processing element accesses the memory and writes the call instruction to the memory. A subroutine may be a chain of one or more commands 301. Each subroutine has a set of one or more commands 301 and a return instruction 302. The return instruction 302 is an instruction having a "return" operation-code portion.

The call instruction in the instruction hub 160 and the return instruction 302 in the address areas 200, 201, 202, 203, 204, 205, 206, 207, 208 allow discontinuities in the sequential loop access of the memory slots 210, 211, 212, 213, 214, 215, 216, 217, 218, 219 in the instruction hub 160 and allow execution of the subroutine stored in an address area 200, 201, 202, 203, 204, 205, 206, 207, 208 and then return to continuing the sequential loop access of the memory slots 210, 211, 212, 213, 214, 215, 216, 217, 218, 219 in the instruction hub 160.

Figure 2:
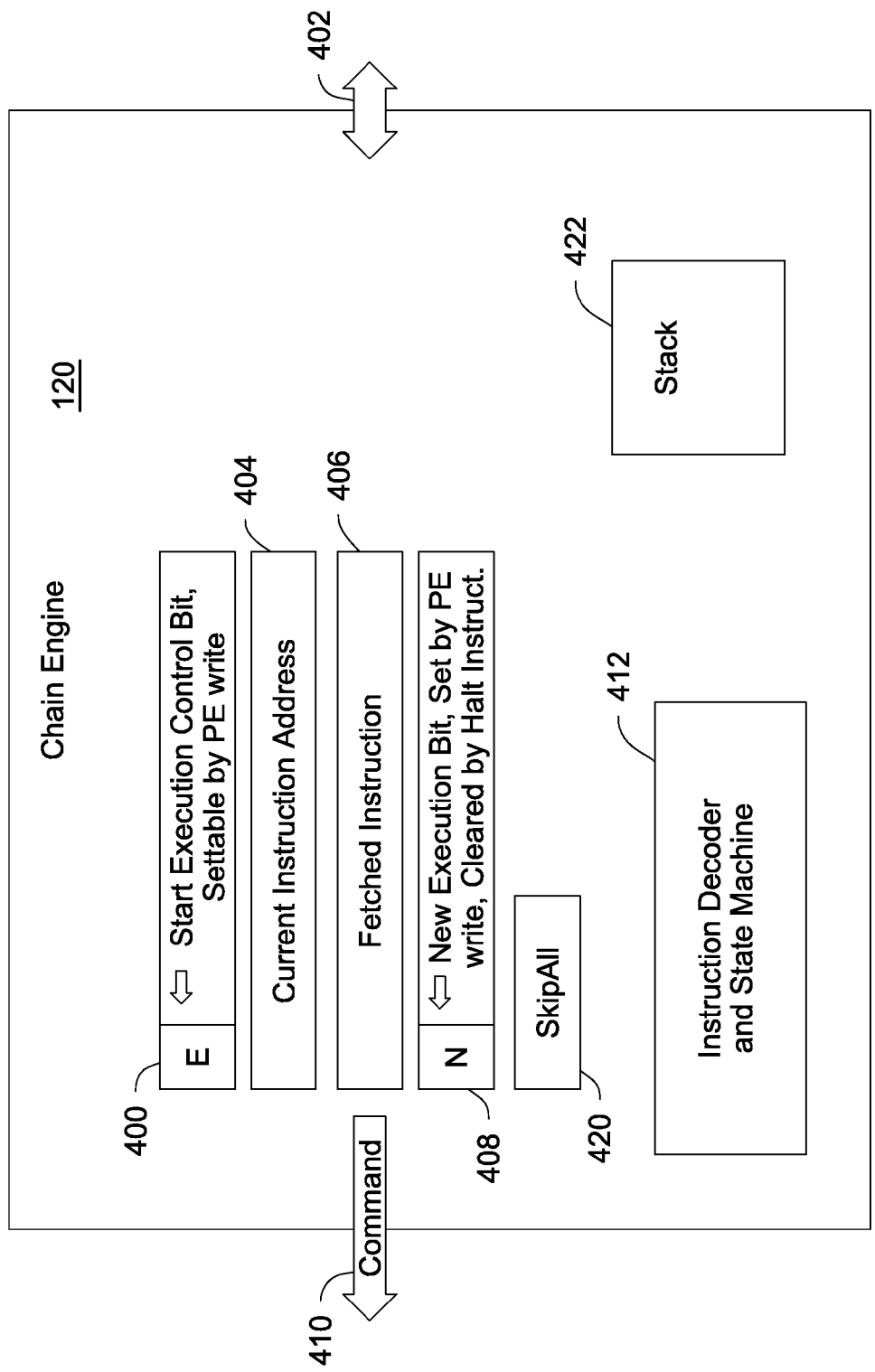
FIG. 2 is a drawing showing a chain engine according to an embodiment.

FIG. 2 shows an embodiment of the chain engine 120 for the single-thread command chain system 10. FIG. 2 shows an execution control bit 400 which controls the start of accessing the memory 140. FIG. 2 shows the chain engine 120 configured for communicating a command 410 to the specialized hardware for operation of the specialized hardware. An embodiment includes the chain engine 120 included in a specialized hardware wherein the command 410 is provided to the specialized hardware that receives the specialized hardware function 150. FIG. 2 shows a read/write communication 402 between the chain engine 120 and the rest of the system 10. FIG. 2 also shows a current instruction address 404 and a fetched instruction 406, and the new execution bit 408. FIG. 2 also shows a SkipAll bit 420.

In an embodiment, each of the processing elements 100, 101, 102, 103, 104, 105, 106, 107, 108 is assigned to a specific address area 200, 201, 202, 203, 204, 205, 206, 207, 208 in a memory 140 for storing a subroutine. The specific address areas 200, 201, 202, 203, 204, 205, 206, 207, 208 are stored in the instruction hub 160 for their call instructions. A processing element initializes the memory 140 with its subroutine, by for example, writing the subroutine into the specific address area 200, 201, 202, 203, 204, 205, 206, 207, 208 in the memory 140. The processing element writes a call instruction into a proper location in the memory 140, such as a slot in the instruction hub 160, wherein the call instruction points to the subroutine and/or the location of the subroutine, such as the address of the specific address area 200, 201, 202, 203, 204, 205, 206, 207, 208 of the memory 140. When the processing element executes, the processing element writes to the chain engine 120 to set the execute bit 400 of the chain engine 120 and the current instruction address 404 is set to the address of the processing element's call instruction. If the chain engine 120 is already in the process of executing when a processing element attempts to set the execute bit, then the current instruction address 404 provided by the processing element is not used because the chain engine 120 is already executing a subroutine and will eventually encounter the processing element's call routine during the sequential loop access of the instruction hub 160. The new execution bit 408 is set in the chain engine 120, which causes the chain engine 120 to treat the next halt instruction as a jump instruction. When the chain engine 120 reads a halt instruction, there is a differential treatment of the halt instruction based on other conditions, such as the state of the SkipAll bit 420 and the state of the new execution bit 408. The chain engine 120 may stop executing and/or accessing the memory 140 or treat the halt instruction as a jump instruction. If the chain engine 120 becomes idle, the chain engine's 120 new execution bit 408 is not set and all instructions since the previously read halt instruction have skip bits 220, 221, 222, 223, 224, 225, 226, 227, 228 set.

The embodiment in FIG. 2 shows an instruction decoder and state machine 412, which stores one or more of the commands 410, indexed according to series of fetched instructions 406, such that when an instruction is fetched from the memory 140, the instruction decoder and state machine 412 is accessed to determine what the instruction is and what action should be performed accordingly. If the operation-code portion of the instruction read is a "command," then the instruction's argument portion stores a command, the command is provided to the specialized hardware that receives the specialized hardware function 150. The instruction decoder and state machine 412 may include an index of instructions and associated commands 410 for providing a command to the specialized hardware, wherein the argument-portion of the instruction can be matched to the associated command 410 from the index of instructions and the associated commands 410.

In an embodiment of a method for single thread command chaining instructions from multiple processing elements 100, 101, 102, 103, 104, 105, 106, 107, 108, there is an execution 602 of the sequential loop access 170 of the sequentially accessible instructions 210, 211, 212, 213, 214, 215, 216, 217, 218, 219 of the instruction hub in the memory 140. Then, one of the sequentially accessible instructions is accessed. If a call instruction is read, then the address area 200, 201, 202, 203, 204, 205, 206, 207, 208 of the memory 140 associated with the call instruction is accessed, a subroutine stored in the address area 200, 201, 202, 203, 204, 205, 206, 207, 208 is read, and the commands of the subroutine are provided to the specialized hardware that receives the specialized hardware function 150 for operation of the specialized hardware. When the chain engine 120 encounters a call instruction, the address of the instruction next in sequence after the call instruction is stored in the stack 422, and instruction execution jumps to the address provided in the argument portion of the call instruction. The address provided in the argument portion being the address of the beginning of a subroutine. At the end of a subroutine, the chain engine 120 encounters a return instruction. The return instruction causes the latest address stored in the stack 422 to be read and used to identify the address where the chain engine 120 will continue its execution, and this will be the next location in sequence after the call instruction that brought the chain engine 120 to the subroutine.

Figure 3:
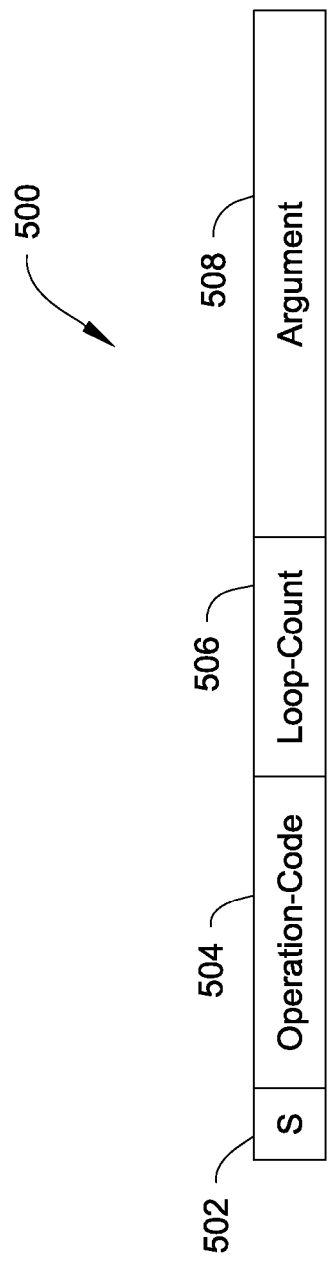
FIG. 3 is a drawing showing an instruction slot format according to an embodiment.

FIG. 3 shows an embodiment of an instruction format 500 for an instruction. The instruction is stored in the memory slot of the instruction hub 160. The instruction format shown has a skip portion 502, which is also shown in FIG. 1 as skip portion 220, 221, 222, 223, 224, 225, 226, 227, 228, an operation-code portion 504, a loop-count portion 506, and an argument portion 508. The skip portion 502, if set, no further action is taken by the chain engine 120 except to increment the current instruction address 404 of the chain engine 120 by one, to access the next instruction. The operation-code portion 504 distinguishes the type of instructions. For example, the operation-code portion 504 may differentiate between a "command," a "call," a "return," a "jump," and/or a "halt." A "command" type indicates that the instruction is a command instruction wherein the argument portion 508 is a command for the specialized hardware or as the specialized hardware function 150. An instruction having A "call" type indicates that the instruction is a call instruction wherein the argument portion 508 provides a value to use as the next instruction address, for example the address of the address area 200, 201, 202, 203, 204, 205, 206, 207, 208 that stores a subroutine. A "return" type indicates that the instruction is a return instruction and causes the chain engine to return to accessing the instruction hub 160 in the memory 140. In an embodiment, the instruction address to which the chain engine 120 will return to is the address stored on the top of the stack 422 which is the address of a next instruction in the instruction hub 160 after the call instruction that led to the return instruction. A "jump" type indicates that the instruction is a jump instruction wherein the argument portion 508 provides a value to use as the next instruction address. In an embodiment, a "halt" type indicates that the instruction is a halt instruction directing the chain engine 120 to stop accessing the instruction hub 160. In another embodiment, there is a differential treatment of the halt instruction by the chain engine 120, wherein the halt instruction is treated as the jump instruction, unless all instructions encountered since the last halt instruction read have the skip bit 502 set and the new execution bit 408 is not set, in which case the "halt" type indicates for the chain engine to stop accessing the instruction hub 160. The loop-count portion 506 indicates a number of times the instruction should be acted upon before setting the skip portion 502 of the instruction. Generally, the return instruction and the halt instructions do not require an indication of the loop-count portion 506. In an embodiment, if the loop-count portion 506 is greater than 1, then the argument portion of the instruction is executed and the instruction is written back as a modified instruction with a changed value to the loop-count portion, wherein the loop-count portion value is decremented by one. If the value of the loop-count portion 506 is 1, then the argument portion in the instruction is executed and the instruction is written back to memory as a modified instruction with the skip bit 502 set. If the value of the loop-count portion 506 is 0, then the argument portion of the instruction is executed and the instruction is not written back to memory as a modified instruction.

An embodiment of the instruction format 500 is a 16 bit format, wherein a bit is set to be the skip portion 502. In another embodiment of a 16 bit instruction format 500, three bits are set to be the operation-code 504.

FIG. 4 shows an algorithm 600, which is an embodiment of a method for the chain engine that performs one or more actions determined by one or more of the operation-code portion, the skip portion, and the loop-count portion. The actions are not limited only to those shown in the algorithm 600 of FIG. 4. The actions shown in FIG. 4 include halting the accessing and setting the chain engine to an idle state, sending a command to a specialized hardware, wherein the command is directed from a data in the argument portion, skipping to a next instruction, writing a modified instruction to the memory, wherein the modified instruction has a different value for the skip portion than the instruction, and writing the modified instruction to the memory wherein the modified instruction has a different value for the loop-count portion than the instruction.

The algorithm 600 for single thread command chaining instructions from multiple processing elements 100, 101, 102, 103, 104, 105, 106, 107, 108 starts at 602 by determining whether an execute bit is set or not set. If the execute bit is not set, then the chain engine 120 remains in idle 604. If the execute bit is set, then the chain engine 120 accesses the memory 140 at a current instruction address 404 and loads the contents into an instruction register 605. Next, a determination is made for a halt instruction 606. If the instruction is read has a "halt" operation-code portion, then a determination is made as to whether the SkipAll bit 420 is set and the new execution bit 408 is not set 607. The state of the SkipAll bit 420 being an indication of the state of all skip bits 502 has been read since the last halt instruction. If the SkipAll bit 420 is set and the new execution bit 408 is not set then the execute bit is cleared 608. If the answer is no at step 607, then the SkipAll bit 420 is set and the new execution bit 408 is cleared 611. From step 608 or step 611 an Argument is loaded into the current instruction address 404 of the chain engine 609. Then the algorithm 600 returns to determining whether an execute bit is set or not set 602.

From step 606, if the instruction read does not have a "halt" operation-code portion, then a determination is made whether the skip bit 502 is set 612. If the skip bit 502 is set, then the current instruction address 404 in the chain engine 120 is incremented by one 613. Then the algorithm 600 returns to determining whether an execute bit is set or not set 602.

From step 612, if the skip bit 502 is not set, then a determination is made as to whether the instruction read has a "return" operation-code portion 614. If the operation-code portion of the instruction is "return," then the chain engine returns to accessing the instruction hub in the memory 615 by reading the address on the top of the stack 422 and placing that address in the current instruction address 404. Then the algorithm 600 returns to determining whether an execute bit is set or not set 602.

From step 614, if the instruction read does not have a "return" type operation-code portion, then the value of the loop-count portion is considered. If the value of the loop-count portion is greater than 1, then the value of the loop-count portion is decremented by 1 in the instruction and the SkipAll bit 420 is cleared 617. Then the instruction is overwritten in the memory 140 with a modified instruction. The modified instruction has a new skip bit 502 value and/or the new loop-count portion value 618.

From step 616, if the loop-count portion value is not greater than 1, and the loop-count value is 1 619, then the skip bit 502 is set 620. Then the instruction is overwritten in memory with a modified instruction 140. The modified instruction has a new skip bit 502 value and/or the new loop-count portion value 618.

From either step 619 or 618, a determination is made as to whether the operation-code portion of the current instruction is a "call" 621. If there is a call instruction, then the current instruction address 404 is incremented by one and that value is pushed into the stack 622, for directing the chain engine to an address in memory to resume execution when a return instruction is read. Then the argument portion is loaded into the current instruction address 623. Then the algorithm 600 returns to determining whether an execute bit is set or not set 602.

From step 621, if the current instruction is not a call instruction (operation-code portion is not a "call"), then a determination is made as to whether the current instruction is a jump instruction (operation-code portion is a "jump") 624. If the current instruction is a jump instruction, then the algorithm 600 proceeds to step 623. If the current instruction is not a jump instruction (operation-code portion is not "jump"), then the instruction or the argument portion is sent to the specialized hardware or as the specialized hardware function 150 as a command 625. Then once the specialized hardware completes the command 410, or when data is received by the chain engine 120 that the command 410 has been completed, the algorithm 600 returns to determining whether an execute bit is set or not set 602.

Those skilled in the art will appreciate that various modifications and substitutions are possible, without departing from the scope of the invention as claimed and disclosed, including the full scope of equivalents thereof.

What is claimed is:

1. A memory, comprising an instruction hub that includes a plurality of instructions, each of the instructions having a format that includes a skip portion, an operation-code portion, a loop-count portion, and an argument portion, wherein each of the instructions is configured such that the skip portion is changeable based on the loop-count portion of the instruction.

2. The memory according to claim 1, further comprising a plurality of subroutines, the argument portion includes memory address for one of the plurality of subroutines.

3. The memory according to claim 2, wherein each subroutine includes at least one command instruction and a return instruction.

4. The memory according to claim 1, wherein the instruction hub includes a jump/halt instruction.

5. The memory according to claim 4, wherein the plurality of instructions in the instruction hub are stored sequentially and the jump/halt instruction is stored at the end of the sequence of the plurality of instructions.

6. A method for command chaining instructions, comprising:

writing an instruction to a memory, wherein the memory includes an instruction hub, the instruction being written into the instruction hub, the instruction includes a skip portion, an operation-code portion, a loop-count portion, and an argument portion, wherein the instruction is configured such that the skip portion is changeable based on the loop-count portion of the instruction; and a chain engine reading the instruction and performing one or more actions determined by one or more of the operation-code portion, the skip portion, and the loop-count portion.

7. The method according to claim 6, wherein the actions comprise one or more of the following:

setting the chain engine to an idle state;

sending a command to a specialized hardware, wherein the command is directed from the argument portion;

skipping to a next instruction;

changing the skip portion; and changing the loop-count portion.

8. The method according to claim 7, wherein changing the skip portion comprises writing a modified instruction to the memory, wherein the modified instruction has a different value for the skip portion than the instruction read by the chain engine.

9. The method according to claim 7, wherein changing the loop-count portion comprises writing a modified instruction to the memory wherein the loop-count portion has a different value than the loop-count portion of the instruction read by the chain engine.

10. The method according to claim 9, wherein the loop-count portion of the modified instruction has a lesser value than the loop-count portion of the instruction read by the chain engine.

11. The method according to claim 8, wherein the skip portion of the modified instruction is determined by the loop-count portion of the instruction read by the chain engine.

12. The method according to claim 6, comprising writing a plurality of the instructions to the memory, wherein each of the instructions includes a skip portion, an operation-code portion, a loop-count portion, and an argument portion, and the chain engine reading one of the instructions and performing one or more actions determined by one or more of the operation-code portion, the skip portion, and the loop-count portion of the read instructions.

13. The method according to claim 12, further comprising writing a jump/halt instruction to the memory.

14. The method according to claim 7, wherein skipping to the next instruction includes reading an address of the next instruction.

15. The method according to claim 6, further comprising providing a processing element that is configured to write the instruction to the memory.

16. The method according to claim 15, wherein the processing element further writes a subroutine to the memory, wherein the subroutine includes a command, and the chain engine reads the argument portion that includes an address of the subroutine, the chain engine storing an address of a next instruction in a stack, wherein the address of the next instruction is in sequence after the instruction read by the chain engine, the chain engine reading the command from the memory, and sending the command to a specialized hardware.

17. A command chain system, comprising:

a memory that includes an instruction hub, wherein the instruction hub includes a plurality of instructions, each of the instructions including a skip portion, an operation-code portion, a loop-count portion, and an argument portion, wherein each of the instructions is configured such that the skip portion is changeable based on the loop-count portion of the instruction;

a chain engine in communication with the memory;

a plurality of processing elements in communication with the memory and the chain engine; and a specialized hardware in communication with the chain engine.

18. The command chain system according to claim 17, wherein the chain engine is configured to start sequential access of the instructions in the instruction hub when one of the plurality of processing elements sends an execution command to the chain engine, the chain engine is configured to perform acts determined by one or more of the operation-code portion the skip portion, and the loop-count portion.

* * * * *